Patented July 26, 1938

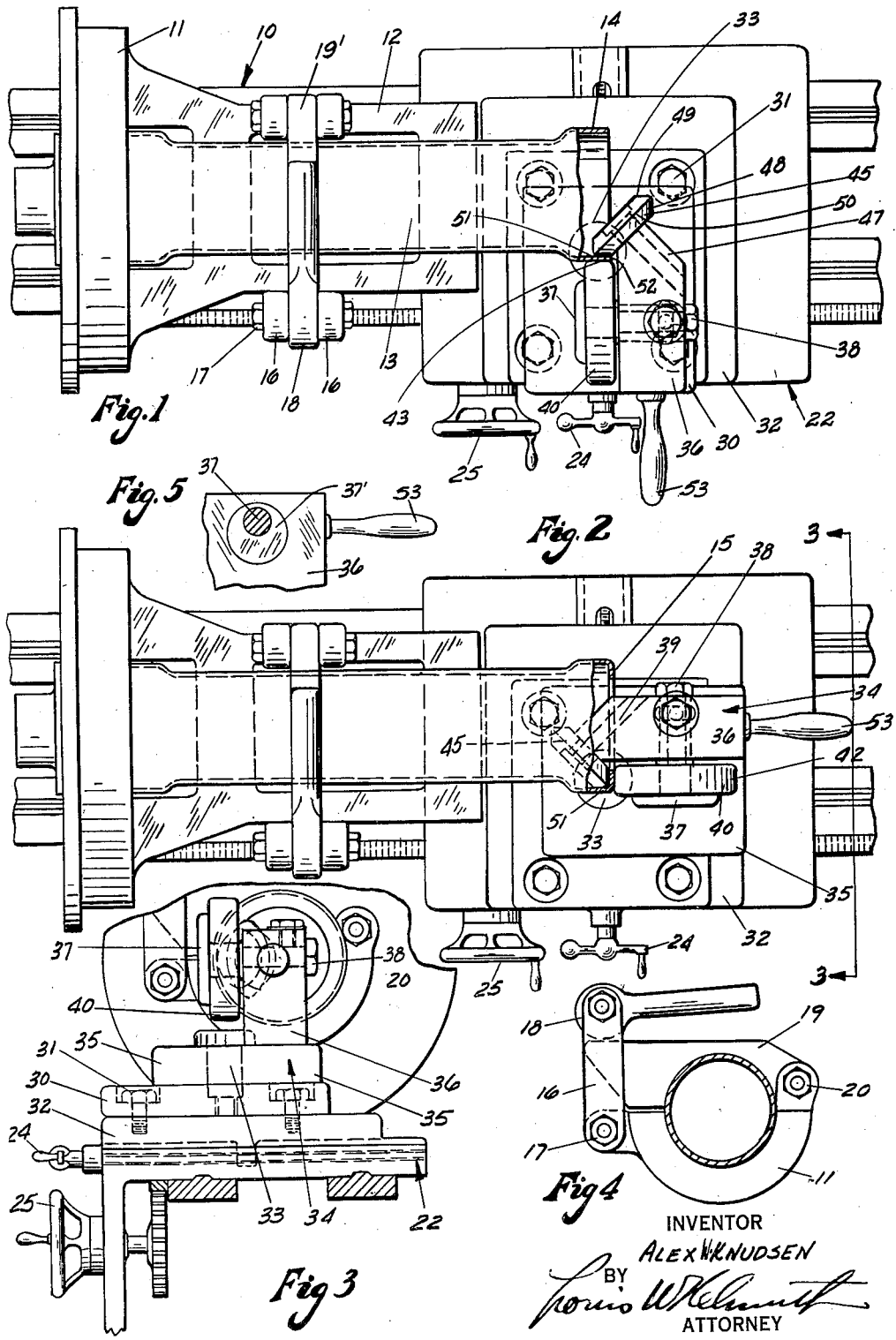

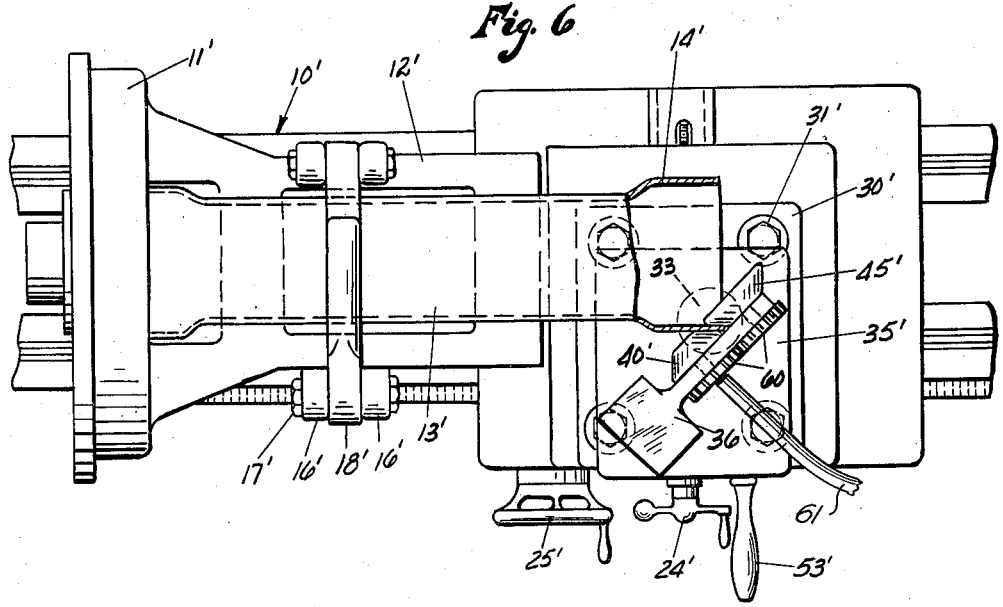
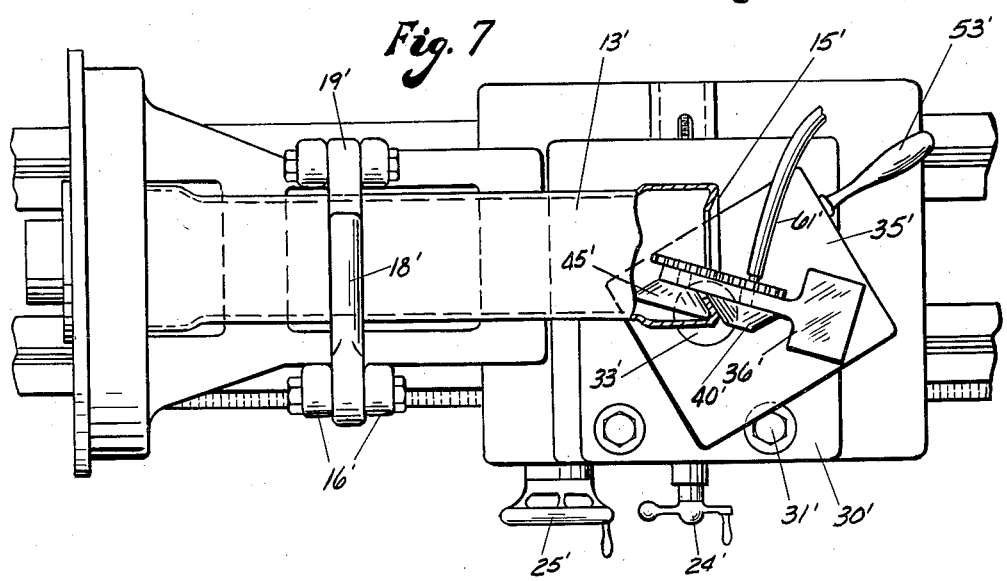

2,124,741

UNITED STATES PATENT OFFICE 2,124,741

METHOD AND APPARATUS FOR WORKING METAL

Alex W. Knudsen, Rocky River, Ohio, assignor to The Midland Steel Products Company, Cleveland, Ohio, a corporation of Ohio Application April 18, 1936, Serial No. 75,210

11 Claims. (Cl. 153—29)

This invention relates to a method and apparatus for working metal, and an important object of the invention is to provide an improved method and apparatus by which a flange can be formed on an annulus such as tubular containers, pipes and the like.

A further object of the invention is to provide a method and apparatus wherein the metal being formed is contoured when cold and is supported upon its opposite surfaces during the forming operation.

Other objects and advantages will become apparent during the course of the following description.

In the accompanying drawings forming a part of the application and wherein like numerals are employed to designate like parts throughout the several views.

Fig. 1 is a plan view of an embodiment of my invention showing the forming means in its initial operative position.

Fig. 2 is a plan view similar to Fig. 1 showing the forming means in another operative position.

Fig. 3 is a fragmentary end view taken on the line 3—3 of Fig. 2, for rigidly holding the annulus in a rotary chuck during the forming operations, Fig. 4 is an elevation of clamp for supporting the work in the chuck, Fig. 5 is a fragmentary section of the form of adjustment for the working tools.

Fig. 6 is a plan view of a modified form of the invention showing the forming means in initial operative position.

Fig. 7 is a plan view similar to Fig. 6 and showing the forming means in another operative position, Referring to the drawings more in detail, the numeral 10 designates a lathe or any other suitable instrumentality for rotating the work or annulus. This instrumentality is provided with a head stock and chuck 11 having a projecting portion 12 to accommodate an annulus or a pipe 13 on the end of which an integral internal flange 15 is to be formed. The annulus 13 is rigidly held in the chuck 11 by means of spaced links 16 pivoted at one end 17 to the chuck and at their opposite ends pivotally support a cam 18 adapted to engage a strap 19 pivoted at 20 to the chuck, as shown in Fig. 4. A tool holder 22 is provided with conventional feeding mechanism for a tool holder of a lathe and has a handle 24 and wheel 25 to respectively control the transverse and longitudinal feed of the tool holder with respect to the bed of the lathe and annulus 13.

The flange forming means are carried by the cross feed device and comprise a plate 30 rigidly mounted by screws 31 to the block 32 of the cross feed device and pivotally mounted on the plate 30 by means of a pivot 33 is a tool holder 34 provided with a base 35 resting on the plate 30 and a portion 36 extending upwardly from the base 35. One of the circular forming tools 40 is journaled about a shaft 37 having a square portion adjustable in a horizontal slot in the upright portion 36 of the tool holder so as to be adjustable radially or to and from the complementary tool 45. The shaft 37 may be extended eccentrically through a rotary mounting 37' which may be slightly turned one way or the other about its axis and held in adjusted position by tightening the bolt 38 whereby the forming tool 40 can be adjusted radially with respect to its work to accommodate work of varying gauge. The forming tool 40 is provided with a flat periphery 42 adapted to frictionally engage the outer surface of the annulus 13 as shown at 43.

The other circular forming tool 45 is journaled upon a fixed shaft 39 mounted in an offset portion 41 of the tool holder 34. The periphery of this forming tool 45 is shown in Figs. 1 to 3 as of V-shape configuration having inclined friction surfaces 48 and 49 terminating in an annular edge 50 which is adapted to engage the interior surface of the annulus at a point where it is to be bent inwardly to form the flange 15. These forming tools 40 and 45 are spaced apart to accommodate a portion of the wall of the annulus 13 and this spacing may be readily varied by relatively adjusting the forming tool 40 by the adjustments above mentioned.

It is important to note that the tool holder 34 swings bodily about its pivotal axis 33, which is along a line substantially tangent to the annular edge 50 of the tapered forming tool 45. In other words, the locus 51 of pivot 33 is disposed generally in the space between the two forming tools and preferably at the center of the bend forming the flange 15 of the annulus.

In operation the operator manipulates the handles 24 and 25 to bring the beveled periphery 48 of the inner forming tool 45 into frictional contact with the inner surface of the end of the annulus 13 as shown in Fig. 1. The axis of the tool 40 is adjusted to bring the periphery 43 of the forming tool 40 into contact with the outer surface of the annulus as shown in Fig. 1, or there may be left a slight clearance between these two rotary tools and the annulus, just so the axis of the pivot 33 is somewhere close to the locus point 51 or the vicinity of the axis of the bend on the annulus forming the flange 15. In this position, the apparatus is ready to go into operation for forming the flange 15. The chuck is then rotated to rotate the annulus 13 which, by reason of its frictional contact with the two forming tools, causes them to also rotate upon their respective axes. The operator then grasps the handle 53 and gradually bodily rotates the tool holder 34 on its pivot 33 about the end of the annulus 13 radially with respect thereto toward the position shown in Fig. 2. During this bodily movement of the forming tool, the inner and outer surfaces of the annulus are effectively supported by the tools so that the metal does not get beyond control to kink or curl. In swinging the tool holder 34 about its pivot 33, the annulus is gradually flanged inwardly about an annular line opposite the annular edge 50 of the inner forming tool 45. It will be noted that the axis 33 of the bodily swing of the forming tools is substantially co-axial with the point of contact 51 or the line of bending of the flange 15 between the annular edge 50 and the inner forming tool 45.

As the operator continues to swing the tool 34, the inclined surface 48 of the inner forming tool effectively backs up the flange being formed while the outer forming tool forces the flange 15 inwardly until the inclined surface 49 of the inner tool engages the annular wall of the annulus to form an indication that the flange 15 is then normal to the annulus or limitations on the pivotal movement holder 34 may be provided. After the flange has been turned to the desired angle with respect to the axis of the annulus, the latter's rotation is stopped and the handles 24 and 25 are manipulated to first move the tool holder toward the axis of the annulus so that the inner tool can be backed out of the annulus to clear the same whereby the annulus can be readily removed from the chuck and another inserted for the bending operation.

It will be observed that throughout the formation of the flange, the wall of the annulus is at all times supported at its inner and outer surfaces by the forming tools, and since they are rotated due to their frictional contact with the rotating annulus, the latter is not appreciably heated during the forming of the flange.

In the modification shown in Figs. 6 and 7 parts corresponding with those of the preceding modification are identified with the same numerals with a prime coefficient. This modification provides for positively rotating the two forming tools 40' and 45' and for bending flanges at an acute angle to the annulus 13'. In this form, the two forming tools 40' and 45' are secured to rotatable shafts journaled in the upright 36' and the tools are provided with oppositely arranged inclined surfaces as shown so that their axis may extend parallel and their shafts provided with meshing spur gears 60, one of which is positively rotated from an external source of power by means of a flexible drive shaft 61. The mode of operation of this modification is identically the same as that disclosed for the preceding modification, except that the forming tools are of slightly different configuration and they are positively driven instead of idling.

While the invention has been illustrated in connection with elongated annuli, it has been found that the method and apparatus can be effectively used for providing flanges on large electric washing machine tubs and similar products. It is of course understood that various changes in the size, shape and arrangement of parts and steps in the method may be resorted to without departing from the spirit of the invention or the scope of the appended claims.

I claim:
1. The method of forming a flange on an annulus consisting of rotating the annulus, causing a forming tool to engage and support opposite surfaces of a wall of the annulus, and then moving said forming tool radially and inwardly of the rotating annulus to bend said wall of the annulus into an inwardly extending annular flange, and moving said tool first inwardly and transversely of the axis of the annulus to disengage the tool from the inwardly extending flange, and then axially of the annulus to withdraw the tool from the interior of the annulus.

2. The method of forming a flange on an annulus consisting of rotating the annulus, engaging rotary forming tools with the inner and outer surfaces of the end of the annulus, and swinging said forming tools bodily inwardly of the annulus as a unit transversely of the annulus about an axis passing through the center of the bend in the metal caused by bodily movement of the forming tools to shape the metal between said tools into an inwardly extending annular flange.

3. A flange forming tool comprising a pair of rotary rollers mounted to move as a unit and having their peripheries spaced apart for the reception of the end of an annulus therebetween for bending the same by bodily movement of the unit, one of said rollers having its periphery V-shaped with one of its faces parallel to the periphery of the other roller and its other face perpendicular to said periphery of said other roller.

4. A flange forming machine comprising means for rotatably supporting an annulus on which a flange is to be formed and flange forming mechanism having roller means engageable with opposite surfaces of the wall of said annulus and movable as a unit about a locus lying in the plane of the annulus and substantially radially of the annulus to form an inwardly extending flange thereon, said roller means being mounted to be moved inwardly rectilinearly and transversely of the axis of the annulus to disengage the inwardly extending flange, and said roller means being also mounted to be moved rectilinearly and axially outwardly from the interior of said annulus.

5. A flange forming machine comprising means for rotatably supporting a tube, rotatably mounted forming tools spaced from each other for the reception of the end edge portion of the tube to frictionally engage and support the adjacent inner and outer surfaces of said end portion, and being movable upon an axis inwardly and transversely about said rotating end portion to form an inwardly extending flange thereon, said forming tools being mounted to be moved inwardly rectilinearly and transversely of the axis of the tube to disengage said inwardly extending flange, and said forming tools being also mounted to be moved rectilinearly and axially outwardly from the interior of said tube.

6. A flange forming machine comprising means for rotatably supporting an annulus having a cylindrical end portion to be flanged, a rotatably mounted inner flange forming tool, a rotatably mounted outer flange forming tool, said forming tools being spaced from each other for the reception therebetween of said rotating end portion to frictionally engage and support respectively the inner and outer surfaces of said cylindrical end portion and to be rotated due to rotation of said annulus, means for bodily swinging said forming tools as a unit inwardly of said rotating end portion about an axis substantially coincident with the locus of a bend to be formed to form an inwardly extending flange, said forming tools being mounted to move rectilinearly as a unit transversely of the axis of the annulus to disengage said flange, and said forming tools being also mounted to move rectilinearly as a unit axially of the annulus to be moved outwardly from the interior of said annulus.

7. A flange forming machine comprising means for rotatably supporting an annulus on which a radial flange is to be formed, flange forming tools spaced from each other for receiving the end of the annulus therebetween and said tools being rectilinearly movable as a unit axially and transversely inwardly of the annulus to enter one of said tools into the annulus, and said tools being bodily movable as a unit about an axis to shape the end of the annulus between the tools into an inwardly extending annular radial flange, said tools being rectilinearly movable as a unit axially and transversely inwardly of the axis of the annulus to disengage said tools from the flange whereby said tools can be moved as a unit rectilinearly axially outwardly from the interior of the annulus.

8. A flange forming machine comprising means for rotatably supporting a tube on which an inwardly extending radial flange is to be formed, idly mounted flange forming rollers spaced from each other for the reception of the end of the tube therebetween, said rollers being bodily movable as a unit about an axis to shape the end of the tube between the rollers into an annular inwardly extending radial flange, and said rollers being movable rectilinearly as a unit both axially and transversely of the tube to enter one of said rollers into the tube prior to formation of the radial flange and to withdraw it from the interior of the tube after formation of said inwardly extending radial flange.

9. The combination with a lathe having a rotary head and a tool carrier rectilinearly movable axially and transversely of the axis of the head, means for rotatably supporting an annulus on which a flange is to be formed, flange forming means mounted to turn as a unit upon an axis on the tool carrier transversely of the annulus to form an inwardly extending flange, said flange forming means being rectilinearly movable transversely of the annulus to disengage the flange, and then rectilinearly axially outwardly to move out from the interior of said annulus.

10. The combination with a lathe having a rotary head and a tool carrier rectilinearly movable axially and transversely of the axis of the head, means for rotatably supporting an annulus on which a flange is to be formed, flange forming rollers mounted to engage opposite sides of an edge of said annulus and to turn as a unit upon a locus in the plane of the annulus and substantially radially of the annulus to form an inwardly extending flange thereon, said rollers having their axes arranged obliquely to the axis of the annulus when engaging and disengaging said edge, and said forming rollers being rectilinearly movable as a unit transversely inwardly of the axis of the annulus to disengage said rollers from the flange whereby the rollers can then be moved as a unit rectilinearly axially out of the annulus.

11. The combination with a lathe having a rotary head, and a tool carrier movable rectilinearly axially and transversely of the axis of the head, means for rotatably supporting an annulus on which a flange is to be formed, a shaft extending vertically from the carrier, a base rotatable about said shaft and having an upright, a pair of rotatably mounted forming tools mounted upon the upright to receive the edge of said annulus therebetween, and said rotatable tools being movable bodily as a unit about such shaft and inwardly of the annulus during rotation of the annulus to form a flange thereon.

ALEX W. KNUDSEN.